United States Patent [19]

Kojima et al.

[11] Patent Number: 5,555,229

[45] Date of Patent: Sep. 10, 1996

[54] METHOD AND ARRANGEMENT FOR RECORDING/REPRODUCING COMPRESSED PROGRAM INFORMATION ON A RECORDING MEDIUM CONTAINING A PLURALITY OF PROGRAMS

[75] Inventors: Kunio Kojima, Nabari; Shigemi Maeda, Yamatokoriyama; Jun Akiyama, Kashihara, all of Japan

[73] Assignee: Sharp Kabushiki Kaisha, Osaka, Japan

[21] Appl. No.: 271,492

[22] Filed: Jul. 7, 1994

[30] Foreign Application Priority Data

Jul. 16, 1993 [JP] Japan ................ 5-177092

[51] Int. Cl.⁶ .................................................. G11B 5/09
[52] U.S. Cl. ............................................ 369/60; 369/58
[58] Field of Search ................................ 369/60, 47, 48, 369/50, 54, 58, 13, 30, 32

[56] References Cited

U.S. PATENT DOCUMENTS

| 5,153,861 | 10/1992 | Maeda et al. . | |
|---|---|---|---|
| 5,212,678 | 5/1993 | Roth et al. | 369/60 |
| 5,220,648 | 6/1993 | Sato . | |
| 5,224,089 | 6/1993 | Matsumura et al. | 369/60 |
| 5,430,703 | 7/1995 | Tsuji et al. | 369/60 |
| 5,444,687 | 8/1995 | Okumura | 369/60 |

FOREIGN PATENT DOCUMENTS

| 0419009 | 3/1991 | European Pat. Off. . |
|---|---|---|
| 0473305A1 | 3/1992 | European Pat. Off. . |
| 0516342 | 12/1992 | European Pat. Off. . |
| 0552806 | 7/1993 | European Pat. Off. . |
| 4016553A1 | 11/1991 | Germany . |
| 61-255536 | 11/1986 | Japan . |
| 63-70988 | 3/1988 | Japan . |
| 4-103079 | 6/1992 | Japan . |
| WO93/01596 | 1/1993 | WIPO . |

*Primary Examiner*—Georgia Y. Epps
*Assistant Examiner*—P. W. Huber
*Attorney, Agent, or Firm*—Nixon & Vanderhye P.C.

[57] ABSTRACT

Pieces of leading compressed information, each of which corresponds to a predetermined number of blocks of each of a plurality of programs recorded on an optical disk, are successively read therefrom, and stored in a buffer memory in a compressed state as they are. Upon reproducing a certain program, the corresponding leading compressed information is read from the buffer memory, and reproduced after having been subjected to a decompressing process in an information-decompression processing circuit. The program is continuously reproduced by reading compressed information corresponding to the predetermined number of blocks following the leading compressed information from the optical disk and supplying the compressed information to the buffer memory. With this arrangement, it is possible to eliminate a slow switching operation in the case when programs are switched to start reproducing a different program.

21 Claims, 14 Drawing Sheets

METHOD AND ARRANGEMENT FOR RECORDING/REPRODUCING COMPRESSED PROGRAM INFORMATION ON A RECORDING MEDIUM CONTAINING A PLURALITY OF PROGRAMS

FIELD OF THE INVENTION

The present invention, which is applied to, for example, information processing apparatuses, such as magneto-optical reproduction apparatuses using magneto-optical disks and compact-disk reproduction apparatuses, relates to a method for making recordings on a recording medium by dividing a plurality of different pieces of digital information into a plurality of blocks and compressing those blocks, and also relates to a reproducing method for the recording medium.

BACKGROUND OF THE INVENTION

Conventionally, an optical-disk recording-reproduction apparatus has been used for recording and reproducing, for example, digital audio information that is digital information whose contents are consecutively recorded.

The optical-disk recording-reproduction apparatus has a construction, for example, as illustrated in FIG. 14, and conducts recording and reproduction. Upon recording, analog audio information is inputted through an input terminal 24, and converted into digital audio information in an A/D converter 14. The digital audio information is further converted into recording information in a recording-data processing circuit 11 so as to become suitable for recording, and is transmitted to a coil driver 5. Then, the coil driver 5 drives a coil 4 so that a modulated magnetic field corresponding to the recording information is applied to an optical disk 1.

Meanwhile, upon receipt of an instruction from a controller 16, a laser driver 6 allows an optical pickup 3 to project a light beam of high power onto the optical disk 1, and the temperature of the optical disk 1 is thus raised locally so as to allow desired information to be recorded thereon.

Upon reproduction, after information of a target recorded area has been extracted from a TOC memory 13, the optical pickup 3 is allowed to access to the area in question. Thus, the information, which was recorded on the optical disk 1, is read out by the optical pickup 3, and directed to a reproduced-data processing circuit 12 through a reproduction amplifier 7.

The reproduced-data processing circuit 12 converts the inputted information into digital audio information, and sends it to a D/A converter 15. The digital audio information is converted into analog audio information in the D/A converter 15, and released from an output terminal 25.

Instructions as to the recording and reproduction are entered through an operation section 17, and converted into control signals for various sections in the controller 16.

Further, the current positional information and operational state of the optical pickup 3 are displayed on a display section 18 under control of the controller 16.

However, in the information recording-reproduction method of the above-mentioned optical-disk recording-reproduction apparatus, for example, in the case of music information, both the read-out operation of a music program from the optical disk 1 that is conducted by the optical pickup 3 and the reproducing operation of the music program are carried out in real time. For this reason, upon switching music programs to be reproduced, the accessing operation of the optical pickup 3 has be be activated, thereby interrupting the reproducing operation for a while; this raises a problem of slow switching operation.

Moreover, when the user tries to recognize what music programs are recorded in the optical disk 1 by actually reproducing those music programs, he or she has to repeatedly give instructions to the optical-disk recording apparatus so as to access each of those music programs. This results in other problems, such as complicated operation and long-time operation.

In order to solve the former problem, the applicant of the present invention has filed Japanese Patent Application No. 9702/1992 (Tokuganhei 4-9702), which has suggested an improved information recording-reproduction method. In this method, a buffer memory is installed, and digital information on an optical disk, which is to be reproduced, is stored in the buffer memory beforehand, and a reproducing operation is then carried out based on the digital information stored in the buffer memory.

In the case when music programs are switched to start reproducing a different one, this information reproducing method provides a switching operation faster than that of the conventional method. For example, suppose that digital audio information of four seconds is converted into information of one second by using compression, and recorded in an optical disk. Upon reproduction, this method allows the optical pickup to read this information from the optical disk in one second, and makes it possible to reproduce audio sound for four seconds by using an information-decompression processing circuit. This means that the optical pickup has an inoperative time of three seconds, and another reading operation for different music programs may be carried out by using this spare time. Furthermore, in the case of again reproducing music programs once stored in the buffer memory, the switching time between the music programs is shortened because those music programs are directly reproduced from the buffer memory.

However, in the above-mentioned information reproducing method that has been suggested by the applicant of the present invention, when a certain music program, which is recorded on the optical disk, is to be reproduced for the first time, the music program in question has to be first stored in the buffer memory. At this time, the accessing operation of the optical pickup is activated; this results in a problem of slow switching operation because it is difficult to start reproducing the music program in question immediately.

Another problem with the conventional information reproduction method is that a large quantity of buffer memory is required since all music programs have to be stored in the buffer memory.

SUMMARY OF THE INVENTION

One first object of the present invention is to provide an information reproduction method and an information recording-reproduction method whereby, upon reproducing digital information of a plurality of programs each of which is recorded on a recording medium in a divided and compressed form with a plurality of blocks, it becomes possible to eliminate a slow operation in switching one program to another program.

A second object of the present invention is to provide an information reproduction method whereby an outline of a plurality of programs recorded on a recording medium is readily recognized through an actual reproducing operation.

In order to achieve the first object, an information reproduction method of the present invention, which is applied to a case when a reproducing operation is conducted on a recording medium whereon a plurality of programs, for example, each of music programs, A, B and C, is recorded in a divided and compressed form with a plurality of blocks, is characterized by comprising steps of:

(1) successively reading pieces of leading compressed information, each of which corresponds to a predetermined number of blocks of each of a plurality of programs recorded on a recording medium, and successively storing the pieces of leading compressed information in a storage means in a compressed state as they are;

(2) upon reproducing a certain program, fetching the corresponding piece of leading compressed information from the storage means, and reproducing the piece of leading compressed information, after having it decompressed in an information-decompression means; and (3) reading compressed information corresponding to the predetermined number of blocks following the leading compressed information of the certain program from the recording medium and supplying the compressed information of the following blocks to the storage means while the leading compressed information is being reproduced.

In accordance with the above arrangement, upon reproducing a program on the recording medium, any program is reproduced by decompressing the leading compressed information stored in the storage means without accessing the recording medium at the initial stage of reproduction; this makes it possible to start the reproducing operation instantaneously.

Moreover, if the compressed information of the following blocks of the currently reproducing program are successively supplied to the storage means to be stored therein during the reproducing process based on the memory in the storage means, it is possible to make a continuous reproduction until the program has been completed.

Furthermore, when, during reproducing a program, a switching operation is made from the program to another, the leading compressed information of the next program is read out from the storage means, and decompressed, thereby allowing the next reproducing operation to be readily started. At this time, there is no need to access the recording medium; thus, it becomes possible to eliminate a slow switching operation.

In addition, if the storage means is logically divided into areas by the number of programs recorded on the recording medium, each program is reproduced while the following blocks are successively supplied to the corresponding area among logically divided areas. As a result, it becomes possible to reduce the memory capacity of the storage means.

Moreover, another arrangement may be adopted wherein in the above-mentioned step (1), only pieces of the leading compressed information of the programs are stored in a specific area in the storage means, and in the above-mentioned step (3), the compressed information of the following blocks of the program being currently reproduced is maintained in an area separated from the specific area that is exclusively used for the pieces of the leading compressed information. In this arrangement, the pieces of the leading compressed information of all the programs are always stored in the specific area in the storage means; therefore, switching is made to a desired program at anytime, and the reproducing operation is started instantaneously. Further, since the compressed information of the following blocks of the program being currently reproduced is successively supplied to the area separated from the specific area, and stored therein, it is possible to make a continuous reproduction until the program has been completed. This arrangement only needs to maintain a separate area so as to store therein one program that is being reproduced; therefore, it is possible to reduce the memory capacity of the storage means, as well as eliminating a slow switching operation in the case when programs are switched to start reproducing a different program.

Furthermore, if the above-mentioned step (1) is executed upon turning on the apparatus, the user regards the above-mentioned storing process merely as a preparing process that takes place upon turning on the apparatus. Since the storing process has been completed by the time when a reproducing operation is started, it is possible to start the reproducing operation on a desired program instantaneously without any waiting time. Therefore, it becomes possible to eliminate a slow switching operation even in the case when programs are switched to start reproducing a different program.

In order to achieve the first object, another information reproduction method of the present invention, which is applied to a case when a reproducing operation is conducted on a recording medium whereon a plurality of programs, for example, music programs of A, B and C, are recorded in a divided and compressed form with a plurality of blocks, is characterized by comprising steps of:

(1) reading out compressed information corresponding to several blocks in a certain program among a plurality of programs recorded on a recording medium and storing the compressed information in a storage means in a compressed state as it is;

(2) fetching the compressed information from the storage means, and reproducing the compressed information, after having it decompressed in an information-decompression means; and (3) during reproduction of the compressed information, reading out pieces of leading compressed information, each of which corresponds to the first several blocks of each of remaining programs, from the recording medium at predetermined intervals, and supplying the pieces of leading compressed information to the storage means in a compressed state as they are.

In accordance with the above arrangement, simultaneously as the first program is reproduced, the leading compressed information of the other programs on the recording medium is read out, and stored in the storage means; thus, it is not necessary to provide time that is required only for storing the leading compressed information of the respective programs in the storage means. Further, this arrangement makes it possible to eliminate a slow switching operation in the case when programs are switched to start reproducing a different program.

In order to achieve the first object, an information recording-reproduction method of the present invention, which is applied to a case when a reproducing operation is conducted on a recording medium whereon a plurality of programs, for example, music programs of A, B and C, are recorded in a divided and compressed form with a plurality of blocks, is characterized by comprising steps of:

(1) storing pieces of leading compressed information of the respective programs, each of which corresponds to a predetermined number of blocks from the leading block of each program, in a storage means; and (2) upon completion of reproducing information from the recording medium, recording in the recording medium the pieces of leading compressed information, each of which corresponds to the predetermined number of blocks from the leading block of each program, and which have been stored in the storage means.

In accordance with the above arrangement, the pieces of leading compressed information of all the programs on the recording medium, each of which corresponds to the predetermined number of blocks from the leading block of each program, are recorded on the recording medium; therefore, when a reproducing operation is conducted on the recording medium next time, it is possible to reduce the number of accessing operations to the recording medium that are needed for storing the leading compressed information in the storage means. Furthermore, this arrangement makes it possible to eliminate a slow switching operation in the case when programs are switched to start reproducing a different program.

In order to achieve the second object, the information reproduction method of the present invention is characterized by comprising the steps of:

(1) reading out pieces of leading compressed information of the respective programs, each of which corresponds to a predetermined number of blocks from the leading block of each program, from the recording medium, and storing the pieces of leading compressed information in a storage means in a compressed state as it is; and (2) successively decompressing only the pieces of leading compressed information of all the programs stored in the storage means by the use of an information-decompression means, and successively reproducing the resulting leading compressed information.

In accordance with the above-mentioned arrangement, it is possible to readily recognize an outline of a plurality of programs recorded on the recording medium within a short period of time by using a simple operation.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

Referring to FIGS. 1 through 4, the following description will discuss one embodiment of the present invention.

Figure 2:
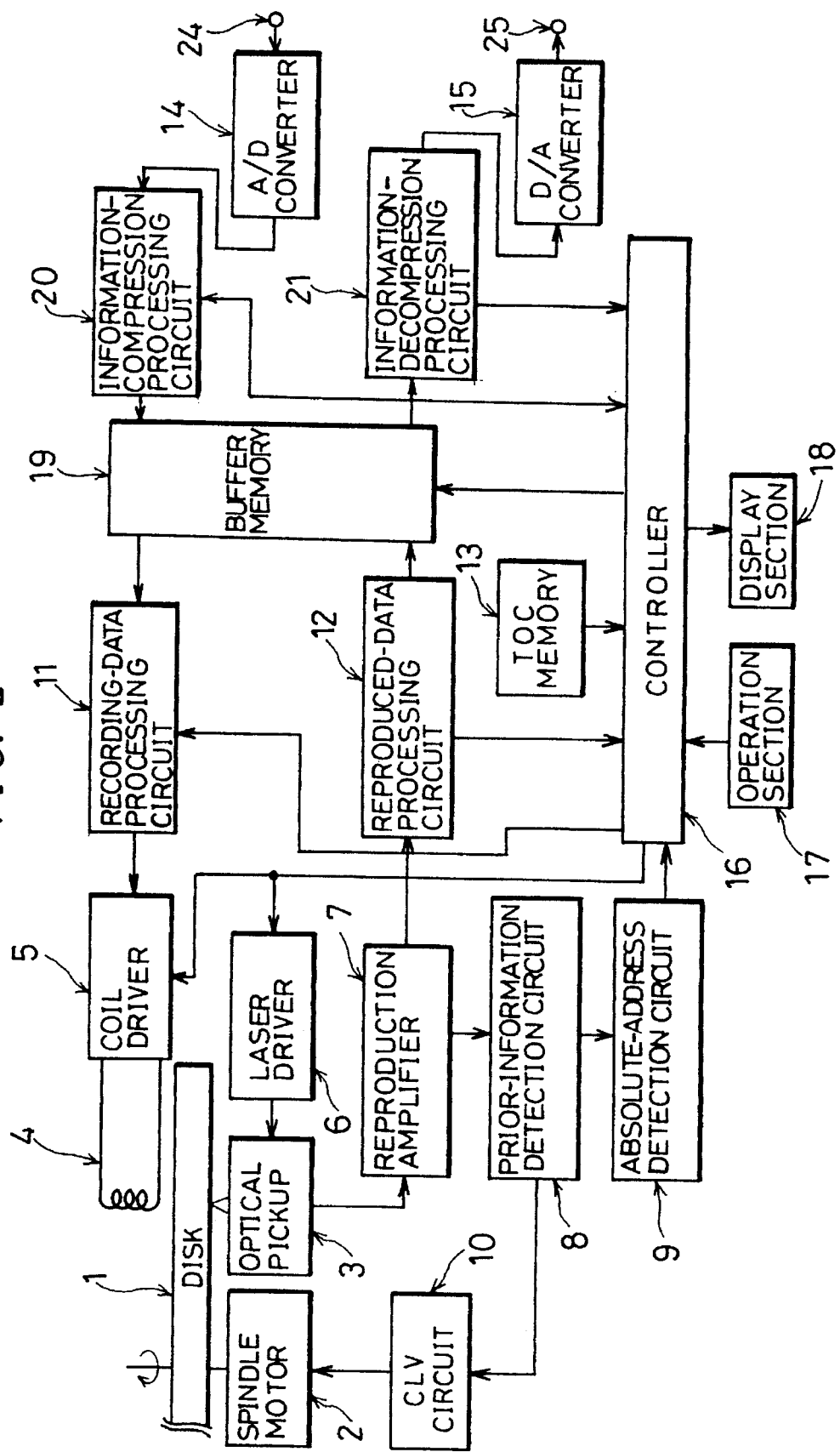
FIG. 2 is a block diagram showing a construction of an optical-disk recording-reproduction apparatus wherein the above-mentioned information reproduction method is adopted.

As illustrated in FIG. 2, for example, an optical-disk recording-reproduction apparatus, which corresponds to the information recording-reproduction apparatus of the present invention, is provided with an optical disk 1 functioning as a recording medium, a coil 4, a recording-data processing circuit 11, a buffer memory 19 functioning as a storage means, an information-compression processing circuit 20, and other devices, as well as having an optical pickup 3, a reproduction amplifier 7, a controller 16, and other devices; thus, both recording and reproducing operations are available.

The coil 4 applies a modulated magnetic field representative of recording information onto the optical disk 1. The optical pickup 3 projects a light beam onto the optical disk 1.

The following description will discuss a recording method on the optical disk 1 in the optical-disk recording-reproduction apparatus.

As illustrated in FIG. 2, upon recording, analog audio information, which is to be recorded, is inputted through an input terminal 24 to an A/D converter 14, where it is converted into digital audio information. The resulting digital audio information is divided into blocks, and compressed block by block, in the information-compression processing circuit 20. The compressed digital audio information is sent through the buffer memory 19 to the recording-data processing circuit 11, where it is converted into recording information suitable for recording block by block, and then sent to a coil driver 5. Further, the coil driver 5 drives the coil 4 so as to allow it to apply a modulated magnetic field representative of the recording information onto the optical disk 1. Simultaneously, the optical pickup 3 projects a light beam of high power onto the optical disk 1 in response to an instruction given by the controller 16 through a laser driver 6. Thus, the temperature of the optical disk 1 is locally raised, thereby allowing desired information to be recorded. Thereafter, in the same manner as described above, the compressing operation for the recording information and the recording operation are carried out at the same time.

Meanwhile, absolute addresses are preliminarily recorded on the optical disk 1 as prior information, and the information obtained through the optical pickup 3 is inputted to a prior-information detection circuit 8 through the reproduction amplifier 7, and part of the information is directed to a CLV (Constant Linear Velocity) circuit 10.

In the CLV circuit 10, CLV control is executed based on the inputted information so that a spindle motor 2 is rotated at a constant linear velocity. Moreover, the information from the prior-information detection circuit 8 is also inputted to an absolute-address detection circuit 9, thereby allowing the controller 16 to have the positional information of the optical pickup 3. As to recorded information, absolute-address information indicating the position of the recorded area is registered and controlled in a TOC (Table Of Contents) memory 13.

The following description will discuss a reproducing operation from the optical disk 1 in detail. Here, an explanation will be given on a case where the reproducing operation is switched from music program A to music program B.

Figure 3:
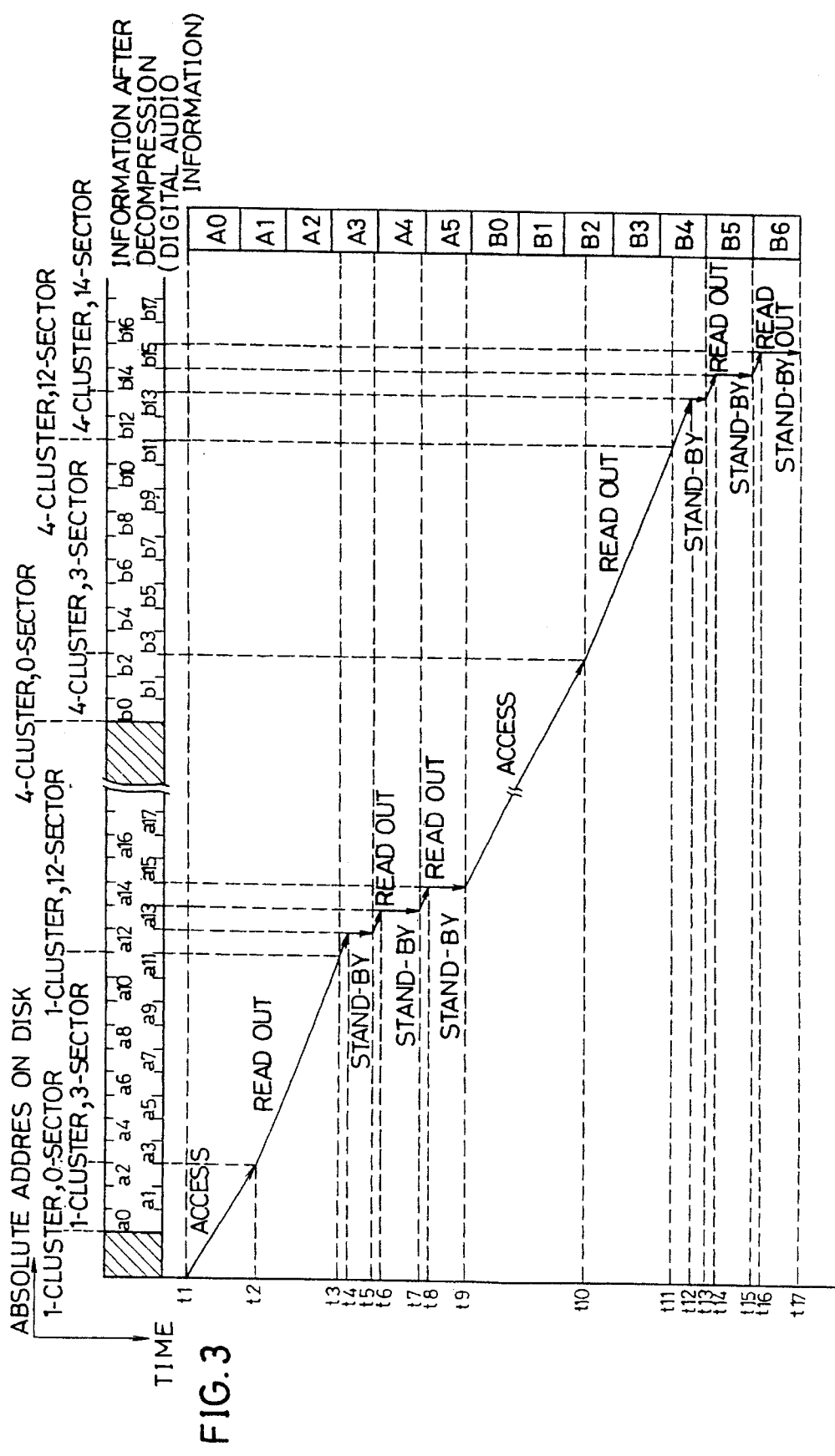
FIG. 3 is an explanatory drawing that shows operations of an optical pickup that vary with the lapse of time during reproduction in the information reproduction method, together with changes in reproducing state of digital audio information which has been subjected to a decompressing operation.
Figure 4:
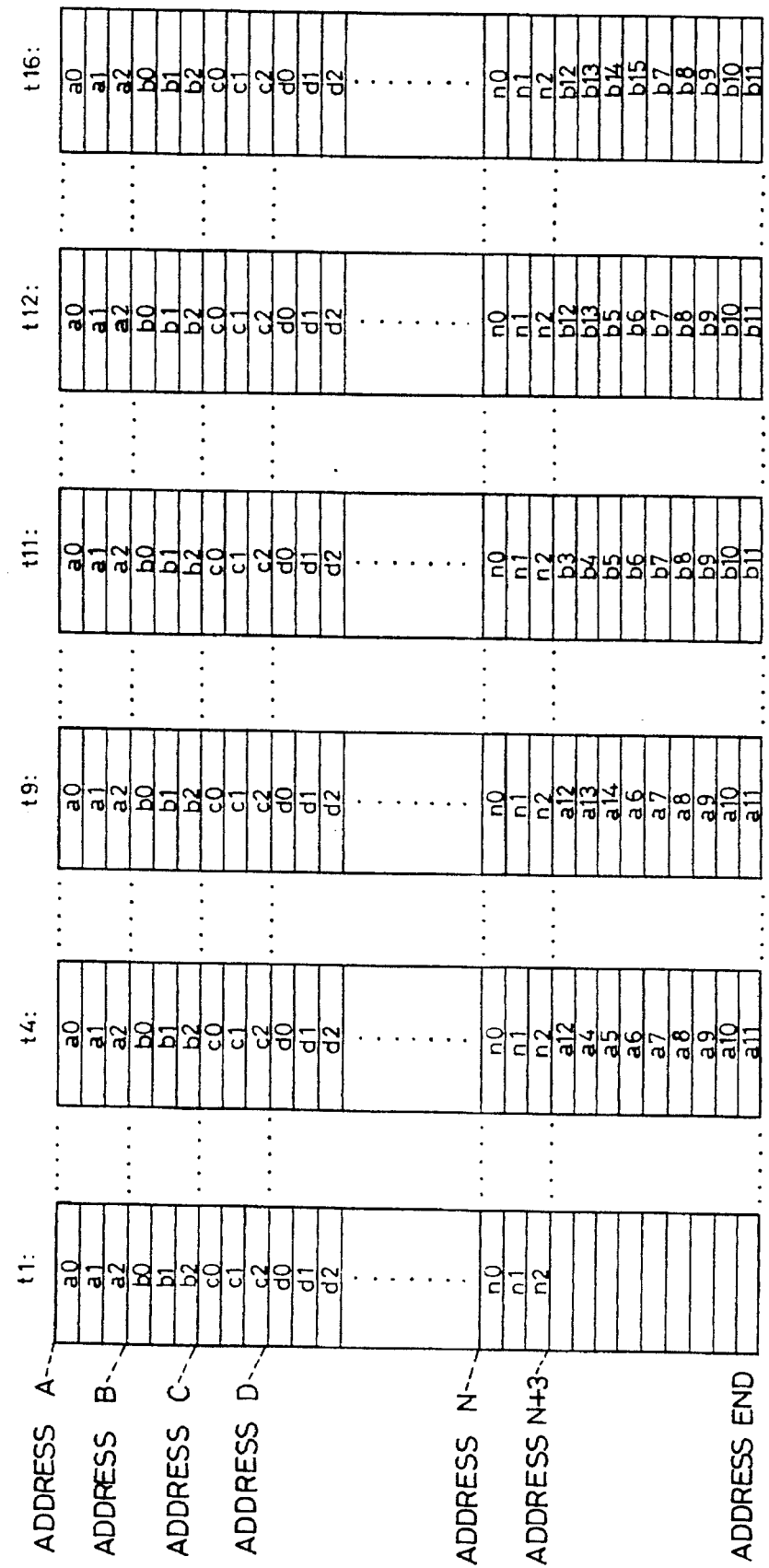
FIG. 4 is an explanatory drawing that shows time-wise changes of compressed information stored in a buffer memory in the optical-disk recording-reproduction apparatus.

As illustrated in FIGS. 2 and 3, when a reproducing operation for music program A is specified through the operation section 17 at time t1, the instruction for reproducing music program A is inputted to the controller 16. At this time, as shown in FIG. 4, the following storages have been already made in the buffer memory 19: the leading compressed information a0, a1 and a2 of music program A stored from address A; the leading compressed information b0, b1 and b2 of music program B stored from address B; the leading compressed information c0, c1 and c3 of music program C stored from address C; the leading compressed information d0, d1 and d2 of music program D stored from address D; . . . ; and likewise the leading compressed information n0, n1 and n2 of music program N stored from address N.

Therefore, the controller 16 first sends the leading compressed information of a0 of music program A in the buffer memory 19 to an information-decompression processing circuit 21. The compressed information a0 is decompressed to form digital audio information A0 in the information-decompression processing circuit 21, and this is sent to a D/A converter 15, and then released from an output terminal 25 as analog audio information.

This sequence of control processes is executed only in the circuit sections; therefore, music program A is reproduced instantaneously at time t1.

Next, the controller 16 extracts absolute-address information indicating the recorded area of music program A from the TOC memory 13. Based on this information, the optical pickup 3 accesses 3-sector of 1-cluster in absolute address, at which the compressed information a3, which follows the compressed information a0, a1 and a2 stored in the buffer memory 19, is recorded, as shown in FIG. 3, and starts reading out the compressed information a3–a12 of music program A from the optical disk 1 at time t2.

During this accessing process, the reproducing operation of the digital audio information A0 has been completed, and the compressed information a1 is successively sent to the information-decompression processing circuit 21 from the buffer memory 19, and the resulting digital audio information A1 is sent to the D/A converter 15, and released from the output terminal 25 as analog audio information.

The compressed information read from the optical disk 1 is sent through a reproduced-data processing circuit 12, and stored in the buffer memory 19 from address N+3 thereof.

During this reading process, the reproducing operation of the digital audio information A1 has been completed, and the compressed information a2 is successively sent to the information-decompression processing circuit 21 from the buffer memory 19, and the resulting digital audio information A2 is sent to the D/A converter 15, and released from the output terminal 25 as analog audio information.

At time t3, the buffer memory 19 becomes filled with the compressed information at address END; however, since the compressed information a3 at address N+3 has been already decompressed, the compressed information a3 is not needed. Therefore, the reading operation from the optical disk 1 is continued successively, and the compressed information a12 is stored at address N+3 in the buffer memory 19.

The optical pickup 3 enters the stand-by state from time t4 when the reading operation has been completed, until an unrecorded area becomes available in the buffer memory 19.

At time t5, the reproducing operation of the digital audio information A3 has been completed, and the compressed information a4 is sent to the information-decompression processing circuit 21 from the buffer memory 19, and the resulting digital audio information A4 is sent to the D/A converter 15, and released from the output terminal 25 as analog audio information.

Therefore, the compressed information a4 is not needed any more, and the optical pickup 3 resumes the reading operation from the optical disk 1, and stores the compressed information a13 in the buffer memory 19. Then, the optical pickup 3 enters the stand-by state until an unrecorded area becomes available in the buffer memory 19, while the reproducing operation of music program A is continued.

Next, at time t9, a reproducing operation for music program B is specified through the operation section 17, and the instruction is inputted to the controller 16. The controller 16 interrupts the reproducing operation of the digital audio information A5 of music program A, and in the same manner as music program A, first sends the compressed information b0 at address B in the buffer memory 19 to the information-decompression processing circuit 21. The compressed information b0 is decompressed to form digital audio information B0 in the information-decompression processing circuit 21, and this is sent to the D/A converter 15, and released from the output terminal 25 as analog audio information.

This sequence of control processes is executed only in the circuit sections; therefore, music program B is reproduced from time t9, thereby enabling an instantaneous switching operation from music A to music B.

Next, the controller 16 extracts absolute-address information indicating the compressed information b3–b13 of music program B from the TOC memory 13, and based on this information, the optical pickup 3 accesses, for example, 3-sector of 4-cluster, and starts reading out the compressed information b3–b12.

During this accessing process, the reproducing operation of the digital audio information B0 has been completed, and the compressed information b1 is successively sent to the information-decompression processing circuit 21 from the buffer memory 19, and the resulting digital audio information B1 is sent to the D/A converter 15, and released from the output terminal 25 as analog audio information.

After the reproducing operation of the digital audio information B1 has been completed, the compressed information b2 is sent to the information-decompression processing circuit 21 from the buffer memory 19, and the resulting digital audio information B2 is sent to the D/A converter 15, and released from the output terminal 25 as analog audio information.

During this reading process, the reproducing operation of the digital audio information B2 has been completed, and in this case, the compressed information b3, which is read from address N+3 of the buffer memory 19, is sent to the information-decompression processing circuit 21, and the resulting digital audio information B3 is sent to the D/A converter 15, and released from the output terminal 25 as analog audio information.

After the reproducing operation of the digital audio information B3 has been completed, the compressed information b4 is sent to the information-decompression processing circuit 21 from the buffer memory 19, and the resulting digital audio information B4 is sent to the D/A converter 15, and released from the output terminal 25 as analog audio information.

At time t11, the buffer memory 19 becomes filled with the compressed information at address END; however, since the compressed information b3 at address N+3 and the following compressed information b4 have been already decompressed, these pieces of compressed information are not needed. Therefore, the reading operation from the optical disk 1 is continued successively, and the pieces of compressed information b12 and b13 are stored from address N+3 in the buffer memory 19.

The optical pickup 3 enters the stand-by state from time t12 when the reading operation has been completed until an unrecorded area becomes available in the buffer memory 19.

At time t13, the reproducing operation of the digital audio information B4 has been completed, and the compressed information b5 is sent to the information-decompression processing circuit 21 from the buffer memory 19, and the resulting digital audio information B5 is sent to the D/A converter 15, and released from the output terminal 25 as analog audio information.

Therefore, the compressed information b5 is not needed any more, and the optical pickup 3 resumes the reading operation from the optical disk 1, and stores the compressed information b14 in the buffer memory 19. Then, the optical pickup 3 enters the stand-by state until an unrecorded area becomes available in the buffer memory 19.

Figure 1:
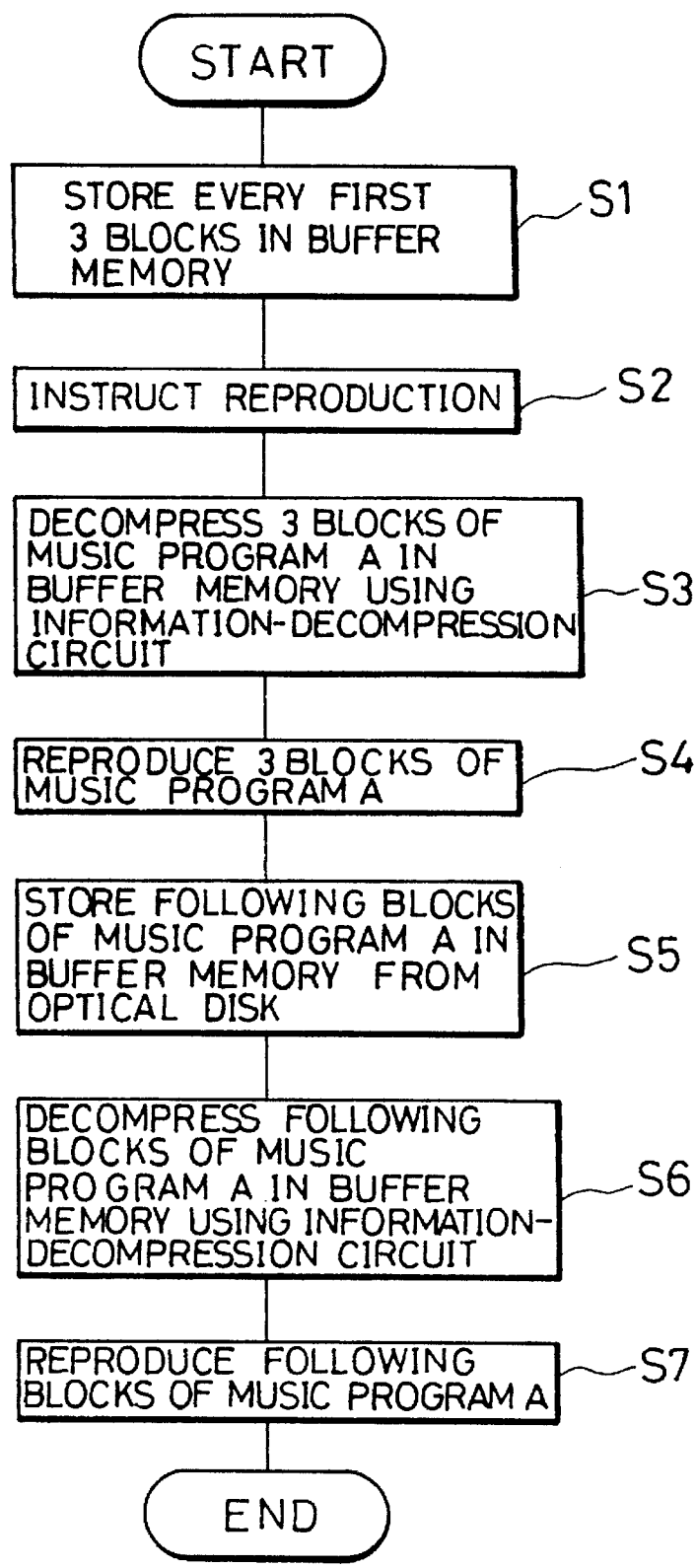
FIG. 1 is a flow chart showing a sequence of reproducing processes that is carried out in one embodiment of the information reproduction method of the present invention.

As shown in the flow chart of FIG. 1, in the information reproduction method of the present invention, pieces of compressed information corresponding to the first three blocks of pieces of digital information representative of a plurality of programs, for example, music programs A, B and C, are preliminarily stored in the buffer memory 19 (S1), and upon reproducing each piece of digital information (S2), the compressed information of the corresponding blocks in the buffer memory 19 is decompressed in the information-decompression processing circuit 21 (S3), and then reproduced (S4). Therefore, no matter which program is first reproduced, the reproducing operation is conducted instantaneously because there is no need to make an accessing operation of the optical disk 1 upon start of the reproducing operation. Moreover, as to the currently reproduced program, while the reproducing operation is being carried out based on the storage of the buffer memory 19, the following blocks are successively supplied to and stored in the buffer memory 19 (S5), and those blocks are decompressed in the information-decompression processing circuit 21 (S6), and then reproduced (S7). This arrangement makes it possible to continuously reproduce the program until it has been completed.

Therefore, also in the case when programs are switched to start reproducing a different program, it is possible to eliminate a slow switching operation because the instantaneous reproducing operation is available.

Moreover, in the information reproduction method of the present embodiment, pieces of compressed information corresponding to the first three blocks of pieces of digital information representative of all programs recorded on a recording medium are always stored in the buffer memory 19; therefore, switching is made to a desired program at anytime. Here, the compressed information corresponding to the following blocks of the currently reproduced program are successively supplied to and stored at a separated area in the buffer memory 19; this arrangement makes it possible to continuously reproduce the program until it has been completed. Therefore, it is possible to reduce the memory capacity of the buffer memory 19, as well as eliminating a slow switching operation at least in the case when programs are switched to start reproducing a different program.

Moreover, it is possible to readily recognize the contents of a plurality of programs recorded on the optical disk 1 by successively reproducing only the leading compressed information of the programs that is stored in the buffer memory 19.

Additionally, in the buffer memory 19 of the present embodiment, pieces of compressed information corresponding to the first three blocks of pieces of digital information representative of a plurality of programs, for example, music programs A, B and C, are stored. However, the present invention is not intended to be limited to this arrangement. The first one, two, or more than four blocks of pieces of compressed information may be stored.

[EMBODIMENT 2]

Referring to FIGS. 2, 4, 5 and 6, the following description will discuss another embodiment of the present invention. Here, for convenience of explanation, those members that have the same functions and that are described in Embodiment 1 with reference to its drawings are indicated by the same reference numerals and the description thereof is omitted.

Figure 6:
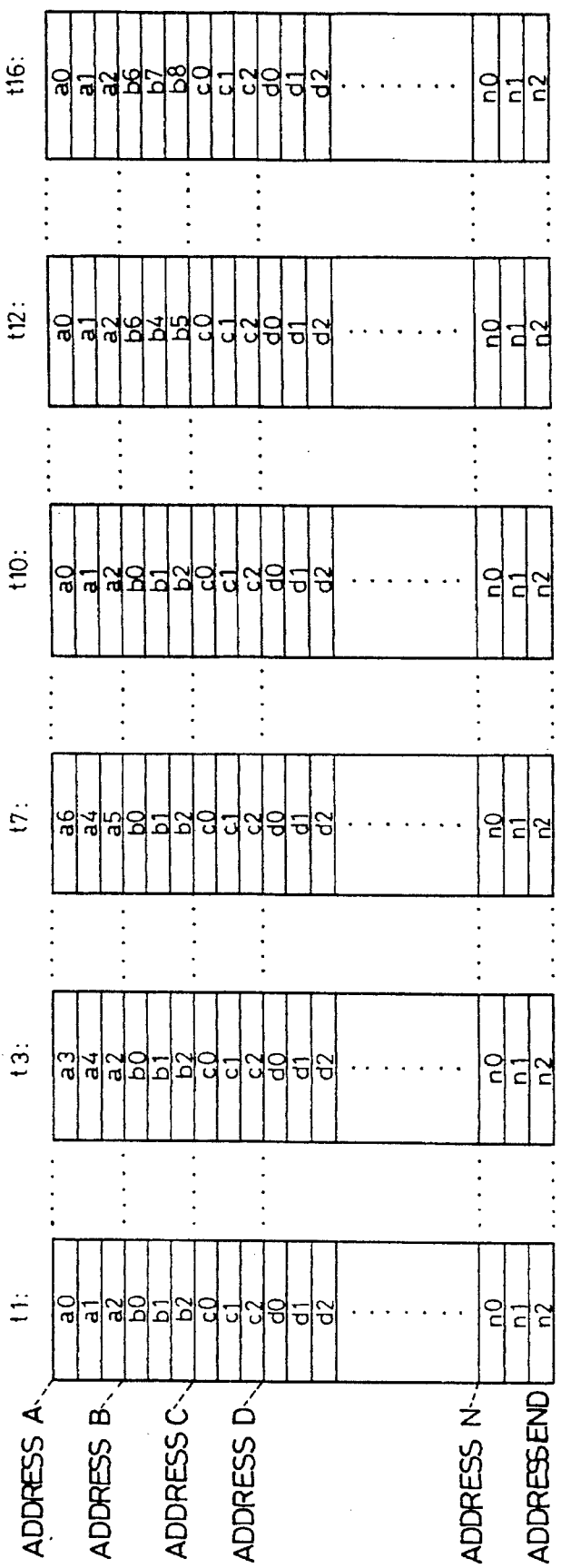
FIG. 6 is an explanatory drawing that shows time-wise changes of compressed information stored in a buffer memory that is uniformly divided by the number of registered music programs in the information reproduction method.

As shown in FIG. 6, the information reproduction method of the present embodiment is characterized in that the logical area of a buffer memory 19 is divided into uniform areas by the number of programs on a recording medium and the leading compressed information of each program and the following compressed information of the same program are stored in the same area.

In this case also, an explanation will be given on a case where the reproducing operation is switched from music program A to music program B.

Figure 5:
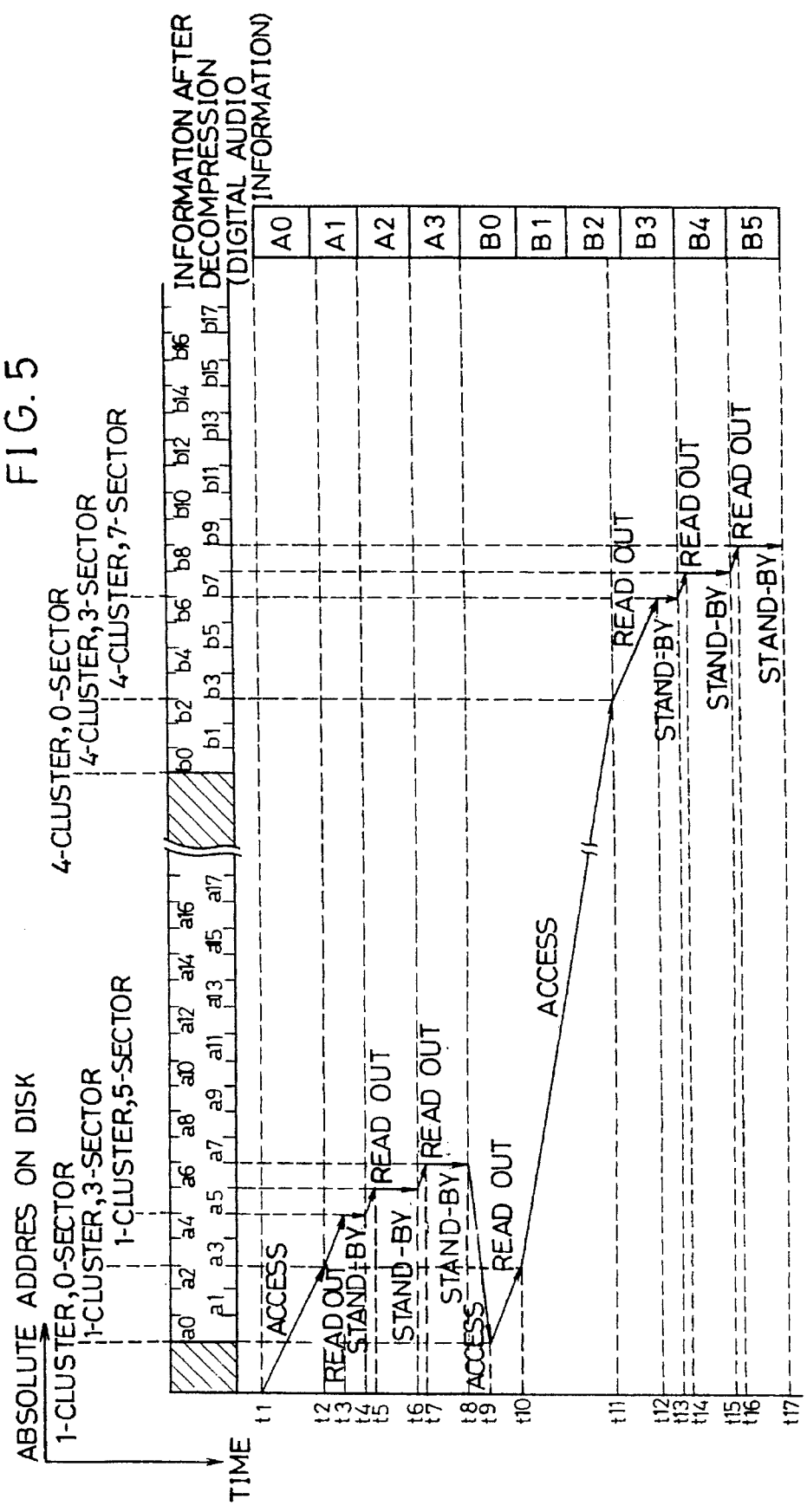
FIG. 5 is an explanatory drawing that shows operations of the optical pickup that vary with the lapse of time in the case when music programs are switched from A to B in the information reproduction method, together with changes of reproducing state of digital audio information which has been subjected to a decompressing operation.

As illustrated in FIGS. 2 and 5, when a reproducing operation for music program A is specified through the operation section 17 at time t1, the instruction for reproducing music program A is inputted to the controller 16. At this time, as shown in FIG. 6, the following storages have been already made in the buffer memory 19: the leading compressed information a0, a1 and a2 of music program A stored from address A; the leading compressed information b0, b1 and b2 of music program B stored from address B; the leading compressed information c0, c1 and c2 of music program C stored from address C; the leading compressed information d0, d1 and d2 of music program D stored from address D; . . . ; and likewise the leading compressed information n0, n1 and n2 of music program N stored from address N.

Therefore, the controller 16 first sends the leading compressed information of a0 of music program A in the buffer memory 19 to an information-decompression processing circuit 21. The compressed information a0 is decompressed to form digital audio information A0 in the information-decompression processing circuit 21, and this is sent to a D/A converter 15, and then released from an output terminal 25 as analog audio information.

This sequence of control processes is executed only in the circuit sections; therefore, music program A is reproduced instantaneously at time t1.

Next, the controller 16 extracts absolute-address information indicating the recorded area of music program A from the TOC memory 13. Based on this information, the optical pickup 3 accesses 3-sector of 1-cluster in absolute address on the optical disk 1, at which the compressed information a3, which follows the compressed information a0, a1 and a2 stored in the buffer memory 19, is recorded, as shown in FIG. 5, and starts reading out the compressed information a3 and a4 of music program A from the optical disk 1 at time t2.

During this accessing process, the reproducing operation of the digital audio information A0 has been completed, and the compressed information a1 is successively sent to the information-decompression processing circuit 21 from the buffer memory 19, and the resulting digital audio information A1 is sent to the D/A converter 15, and released from the output terminal 25 as analog audio information. Therefore, the compressed information a0 and a1 obtained from address A in the buffer memory 19 is not needed any more. The compressed information a3 and a4, which is read out from the optical disk 1, is sent through the reproduced-data processing circuit 12, and stored in the buffer memory 19 in succession starting with address A.

At time t3, the area used exclusively for music program A in the buffer memory 19 becomes filled with the compressed information; therefore, the optical pickup 3 completes the reading operation, and enters the stand-by state until an unrecorded area becomes available in the buffer memory 19.

At time t4, the reproducing operation of the digital audio information A1 has been completed, and the compressed information a2 is sent to the information-decompression processing circuit 21 from the buffer memory 19, and the resulting digital audio information A2 is sent to the D/A converter 15, and released from the output terminal 25 as analog audio information. Therefore, the compressed information a2 is not needed any more, and the optical pickup 3 resumes the reading operation from the optical disk 1, and stores the compressed information a5 in the buffer memory 19. Then, the optical pickup 3 enters the stand-by state until an unrecorded area becomes available in the buffer memory 19.

Thus, the reproducing operation of music program A is continued.

Next, at time t8, a reproducing operation for music program B is specified through the operation section 17, and the instruction is inputted to the controller 16. The controller 16 interrupts the reproducing operation of the digital audio information A3 of music program A, and in the same manner as music program A, first sends the compressed information b0 at address B in the buffer memory 19 to the information-decompression processing circuit 21. The compressed information b0 is decompressed to form digital audio information B0 in the information-decompression processing circuit 21, and this is sent to the D/A converter 15, and released from the output terminal 25 as analog audio information.

This sequence of control processes is executed only in the circuit sections; therefore, music program B is reproduced immediately after time t8, thereby enabling an instantaneous switching operation from music A to music B.

Next, the controller 16 extracts absolute-address information indicating the recorded area of music program A from the TOC memory 13. Based on this information, the optical pickup 3 accesses 0-sector of 1-cluster in absolute address on the optical disk 1, from which the leading compressed information a0, a1, and a2 of already finished music program A is recorded, and starts reading out the compressed information a0, a1 and a2 of music program A from the optical disk 1 from time t9 on. The compressed information thus read out is sent through the reproduced-data processing circuit 12, and stored in the buffer memory 19, starting with address A. This control process is important because it is carried out so as to prepare for the next reproducing operation for music program A.

At time t10, the reading operation has been completed, and the controller 16 extracts absolute-address information indicating the recording area of music program B on the optical disk 1 from the TOC memory 13. As shown in FIG. 5, based on this information, the optical pickup 3 accesses 3-sector of 4-cluster in absolute address at which the compressed information b3, which follows the compressed information b0, b1 and b2 stored in the buffer memory 19, is recorded, and starts reading out the compressed information b3–b6 of music program B from the optical disk 1 from time t11 on.

During these accessing and reading operations, the reproducing operation of the digital audio information B0, B1 and B2 has been completed.

At time t13, the reproducing operation of the digital audio information B3 has been completed, and the compressed information b4 is sent to the information-decompression processing circuit 21 from the buffer memory 19, and the resulting digital audio information B4 is sent to the D/A converter 15, and released as analog audio information. Therefore, the compressed information b4 is not needed any more, and the optical pickup 3 resumes the reading operation from the optical disk 1, and stores the compressed information b7 in the buffer memory 19. Then, the optical pickup 3 enters the stand-by state until an unrecorded area becomes available in the buffer memory 19. Thus, the reproducing operation of music program B is continued.

As described above, in the information reproduction method of the present embodiment, the buffer memory 19 is logically divided by the number of programs N recorded on the recording medium in a uniform manner. Therefore, each program is reproduced while the following blocks are successively supplied to and stored in an area exclusively used for the program in question in the buffer memory 19. As a result, it becomes possible to reduce the memory capacity of the buffer memory 19.

Additionally, in the buffer memory 19 of the present embodiment, pieces of compressed information corresponding to the first three blocks of pieces of digital information representative of a plurality of programs, for example, music programs A, B and C, are stored. However, the present invention is not intended to be limited to this arrangement. The first one, two, or more than four blocks of pieces of compressed information may be stored.

[EMBODIMENT 3]

Figure 7:
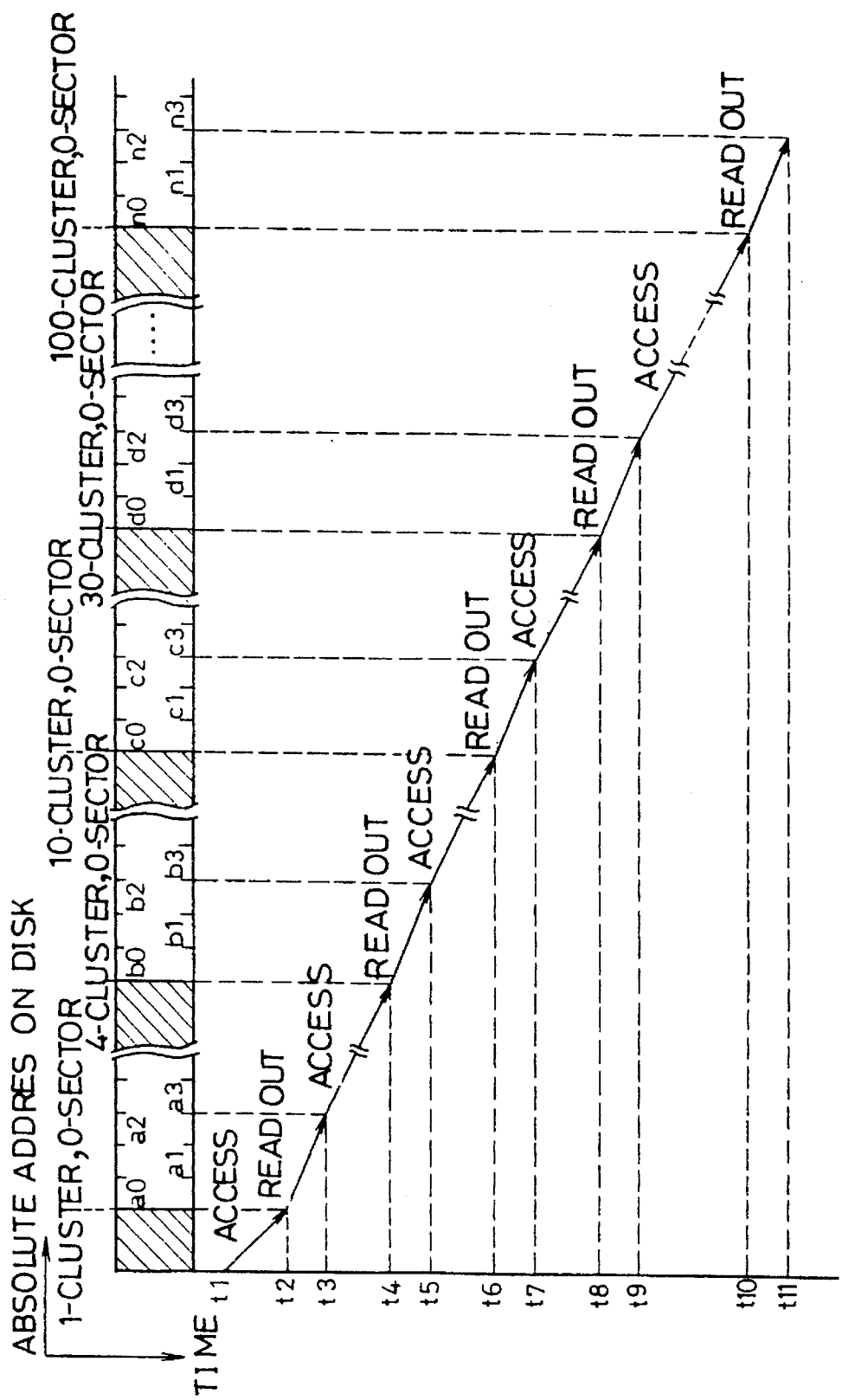
FIG. 7 is an explanatory drawing that shows operations of the optical pickup that vary with the lapse of time in the case of successively storing leading compressed information of each music program in a buffer memory upon turning on the apparatus in the information reproduction method.
Figure 8:
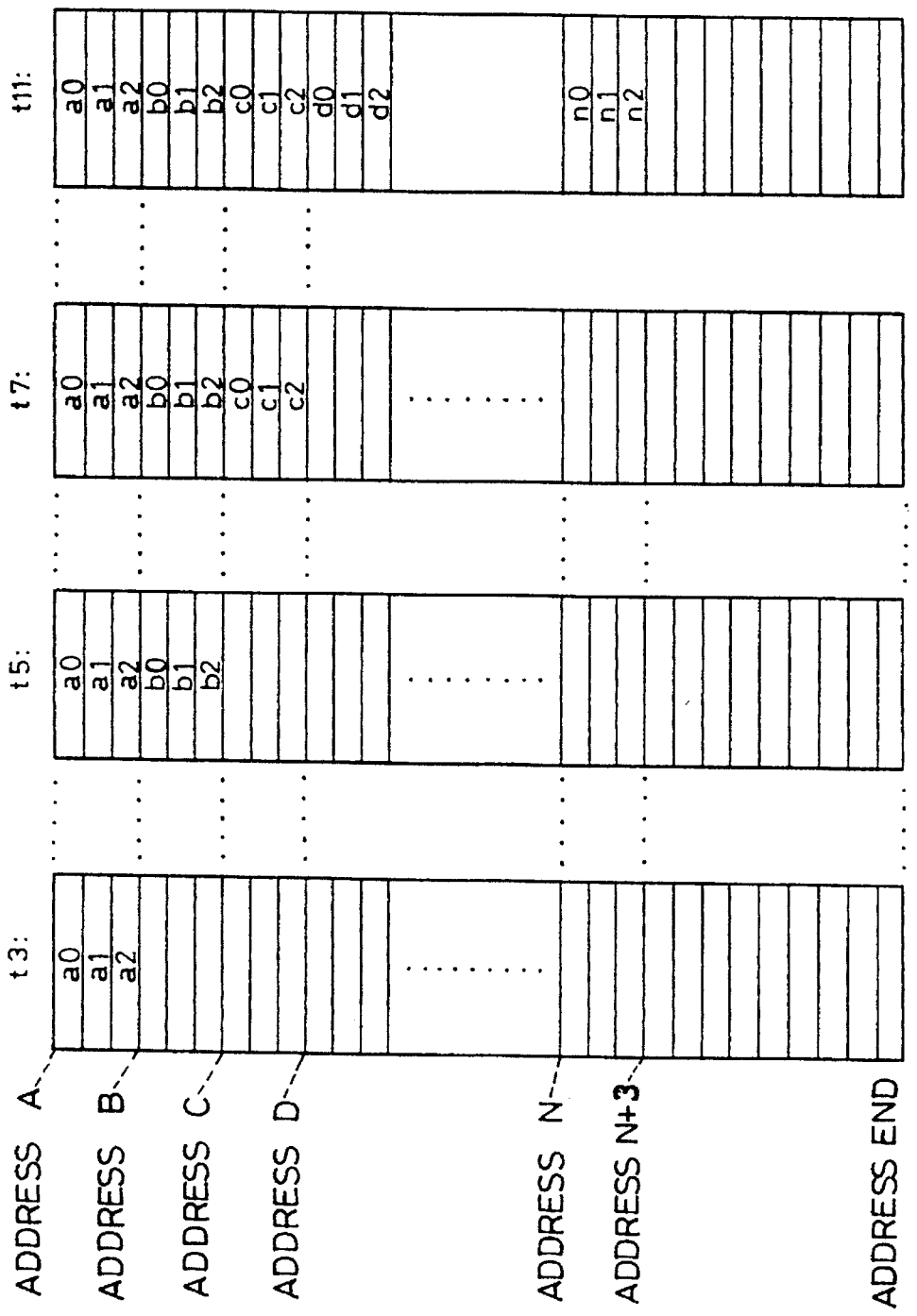
FIG. 8 is an explanatory drawing that shows time-wise changes of compressed information stored in the buffer memory in the case of successively storing a plurality of registered music programs upon turning on the apparatus in the information reproduction method.

Referring to FIGS. 2, 7 and 8, the following description will discuss another embodiment of the present invention. Here, for convenience of explanation, those members that have the same functions and that are described in Embodiment 1 with reference to its drawings are indicated by the same reference numerals and the description thereof is omitted.

The information reproduction method of the present embodiment is characterized in that, when the apparatus is turned on, the leading compressed information of all programs on a recording medium is stored in the buffer memory 19.

More specifically, as illustrated in FIGS. 2 and 7, when the apparatus is turned on, the controller 16 extracts absolute address information of all programs recorded on the optical disk 1 from the TOC memory 13. As shown in FIG. 7, based on the information thus extracted, apparatuses the optical pickup 3 makes an access to 0-sector of 1-cluster in the absolute address at which the compressed information a0 of music program A is recorded, and starts reading out the compressed information a0, a1 and a2 from time t2. The read-out compressed information a0, a1 and a2 is sent through the reproduction amplifier 7 and the reproduced-data processing circuit 12, and stored in the buffer memory 19, starting with address A (see FIG. 8). Successively, from time t3 at which the read-out operation has been completed, the optical pickup 3 makes an access to 0-sector of 4-cluster in the absolute address at which the compressed information b0 of music program B is recorded, and starts reading out the compressed information b0, b1 and b2 from time t4. The read-out compressed information b0, b1 and b2 is sent through the reproduction amplifier 7 and the reproduced-data processing circuit 12, and stored in the buffer memory 19, starting with address B (see FIG. 8).

In the same manner as described above, the leading compressed information related to all the programs recorded in the optical disk 1 has been stored in the buffer memory 19 by time t11. Therefore, the reproducing operation is available from time t11 on.

As described above, in the information reproduction method of the present embodiment, the compressed information corresponding to the first three blocks of all the programs recorded on the recording medium is preliminarily stored in the storage means. Since this process is carried out when the apparatus is turned on, the user regards the process merely as a preparing process that takes place upon turning on the apparatus. Since the storing process has been completed by the time when a reproducing operation is started, it is possible to start the reproducing operation on a desired program instantaneously without any waiting time. Therefore, it becomes possible to eliminate a slow switching operation even in the case when programs are switched to start reproducing a different program.

Additionally, in the buffer memory 19 of the present embodiment, pieces of compressed information corresponding to the first three blocks of pieces of digital information representative of a plurality of programs, for example, music programs A, B and C, are stored. However, the present invention is not intended to be limited to this arrangement. The first one, two, or more than four blocks of pieces of compressed information may be stored.

[EMBODIMENT 4]

Figure 9:
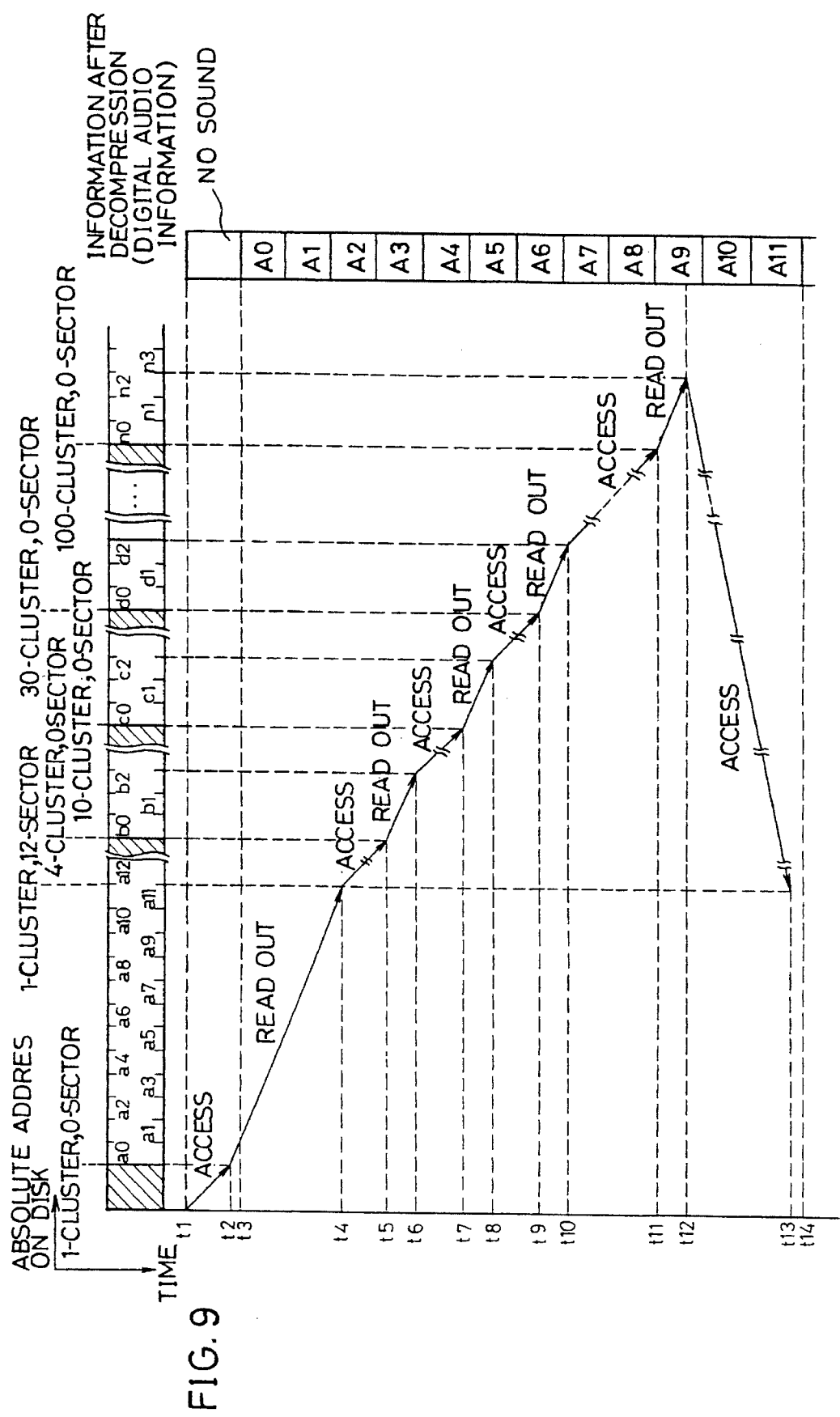
FIG. 9 is an explanatory drawing that shows operations of the optical pickup that vary with the lapse of time in the case of storing the leading compressed information of each music program in the buffer memory while reproducing a certain music program in the information reproduction method, together with changes of reproducing state of digital audio information which has been subjected to a decompressing operation.
Figure 10:
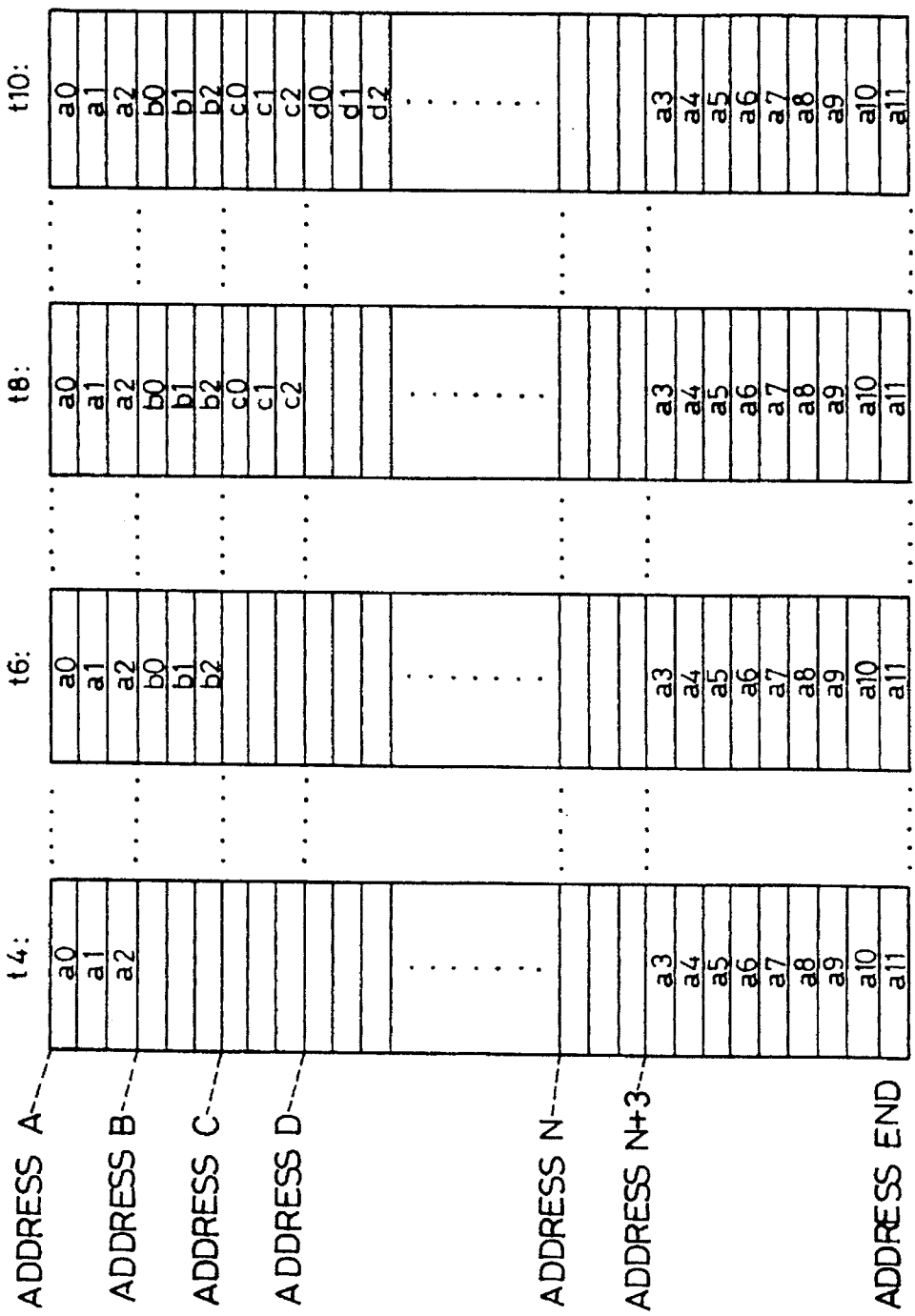
FIG. 10 is an explanatory drawing that shows time-wise changes of compressed information stored in the buffer memory, the compressed information being made by storing compressed information corresponding to the predetermined number of blocks from each leading portion of the respective programs in a predetermined area as well as storing the following compressed information in a different area in the information reproduction method.

Referring to FIGS. 2, 9 and 10, the following description will discuss another embodiment of the present invention. Here, for convenience of explanation, those members that have the same functions and that are described in Embodiment 1 with reference to its drawings are indicated by the same reference numerals and the description thereof is omitted.

The information reproduction method of the present embodiment is characterized in that, while a certain program is being reproduced, leading compressed information related to the other programs is stored in the buffer memory 19.

As illustrated in FIG. 2, an instruction for reproducing music program A is inputted to the controller 16. The controller 16 extracts absolute-address information indicating the recorded area of music program A on the optical disk 1 from the TOC memory 13. Next, as shown in FIG. 9, the optical pickup 3 makes an access to 0-sector of 1-cluster in the absolute address, from which music program A is recorded, and starts reading out the compressed information a0 through all from time t2.

The read-out operation of the compressed information a0 is completed at time t3, and the compressed information a0 is sent to the information-decompression processing circuit 21 from the buffer memory 19, and the resulting digital audio information A0 is sent to the D/A converter 15, and released from the output terminal 25 as analog audio information. Therefore, the reproducing operation of music program A is started from time t3.

The read-out operation of music program A is continued until time t4. During this read-out operation, the digital audio information A1 and A2 are successively reproduced. As shown in FIG. 10, at time t4, the compressed information a0, a1 and a2 is stored in the buffer memory 19, starting with address A, and the compressed information a3 through all is stored therein, starting with address N+3.

Next, the optical pickup 3 makes an access to 0-sector of 4-cluster in the absolute address in order to read out the leading compressed information of music program B, and starts reading out the compressed information b0, b1 and b2 from time t5, and the resulting information is stored in the buffer memory 19, starting with address B.

During this sequence of operations, the compressed information a3 of music program A is successively sent to the information-decompression processing circuit 21, and the resulting digital audio information A0 is sent to the D/A converter 15, and released from the output terminal 25 as analog audio information; thus, the reproducing operation of music program A is continued. In the same manner as described above, the leading compressed information of all the programs recorded on the optical disk 1, music programs C, D, . . . and N, is successively stored in the buffer memory 19. During this process, the reproducing operation of music program A is simultaneously continued.

The optical pickup 3, which has finished reading out the leading compressed information of all the programs by time t12, makes an access to 12-sector of 1-cluster in the absolute address in order to read out the following compressed information a12 of music program A, and starts the read-out operation from time t13.

As described above, in the information reproduction method of the present embodiment, simultaneously as the first program is reproduced, the compressed information corresponding to the first three blocks of the other programs is stored in the buffer memory 19. Thus, it is not necessary to provide time that is required only for storing the leading compressed information of the respective programs in the buffer memory 19. Further, this arrangement makes it possible to eliminate a slow switching operation in the case when programs are switched to start reproducing a different program.

Additionally, in the buffer memory 19 of the present embodiment, pieces of compressed information corresponding to the first three blocks of pieces of digital information representative of a plurality of programs, for example, music programs A, B and C, are stored. However, the present invention is not intended to be limited to this arrangement. The first one, two, or more than four blocks of pieces of compressed information may be stored.

[EMBODIMENT 5]

Figure 11:
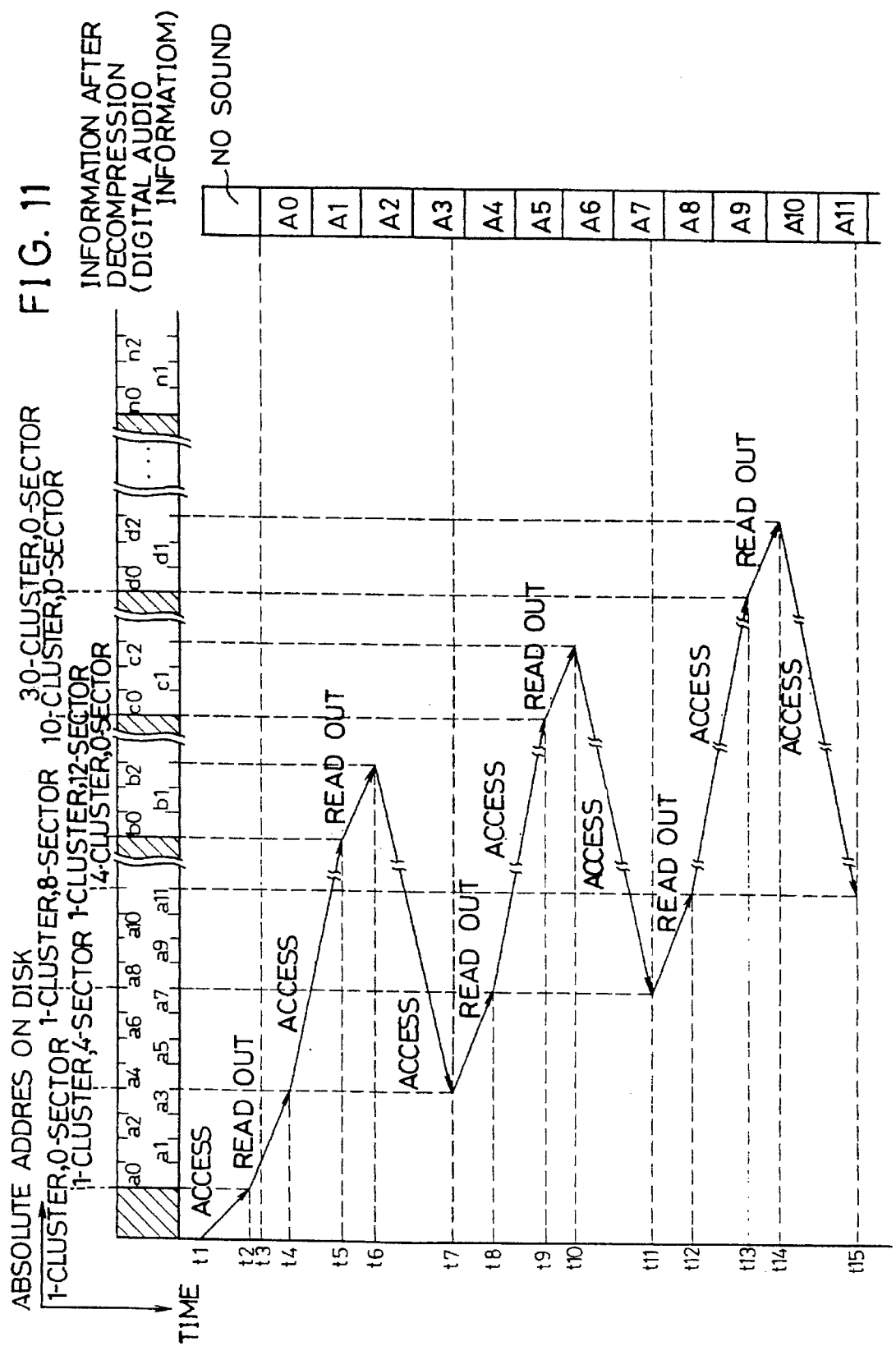
FIG. 11 is an explanatory drawing that shows operations of the optical pickup that vary with the lapse of time in the case of storing the leading compressed information of each music program in the buffer memory while reproducing a certain music program, as well as storing the following compressed information of each music program in the buffer memory in the course of the reproduction in the information reproduction method, together with changes of reproducing state of digital audio information which has been subjected to a decompressing operation.
Figure 12:
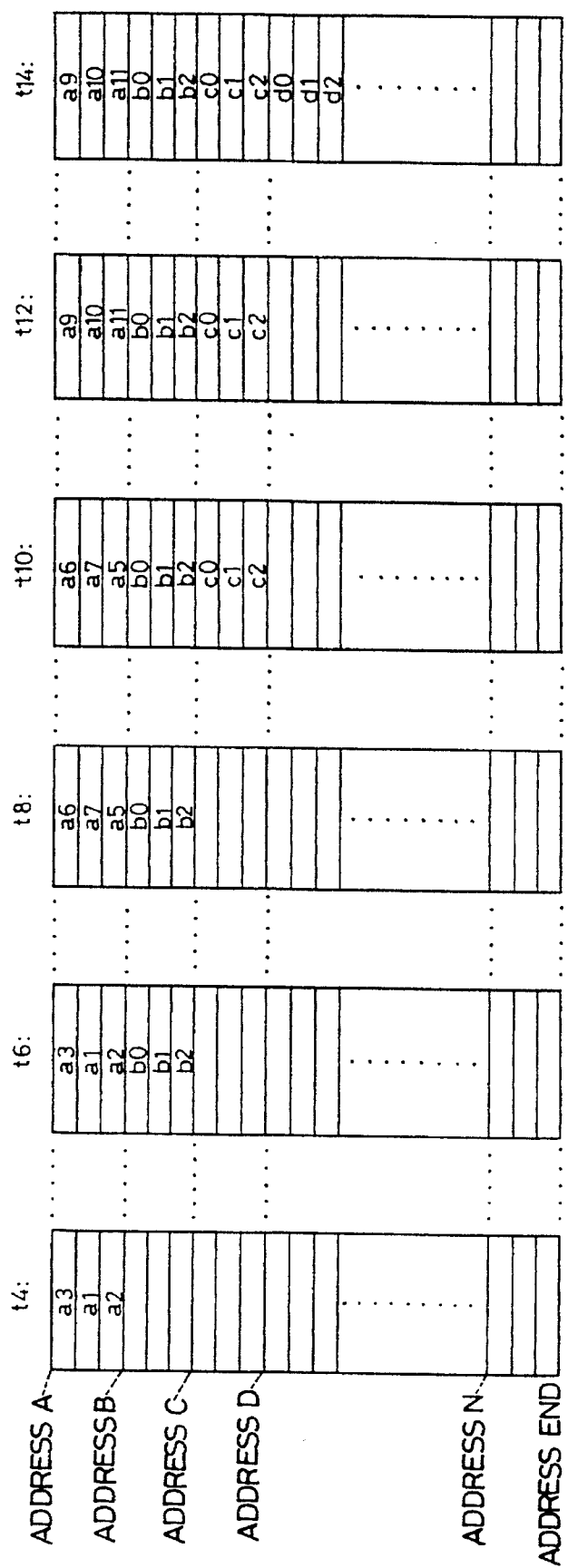
FIG. 12 is an explanatory drawing that shows time-wise changes of compressed information stored in the buffer memory in the case of storing the leading compressed information of each music program in the buffer memory while reproducing a certain music program, as well as storing the following compressed information of each music program in the buffer memory in the course of the reproduction.

Referring to FIGS. 2, 11 and 12, the following description will discuss another embodiment of the present invention. Here, for convenience of explanation, those members that have the same functions and that are described in Embodiment 1 with reference to its drawings are indicated by the same reference numerals and the description thereof is omitted.

The information reproduction method of the present embodiment is characterized in that, in the information reproduction method shown in Embodiment 4 wherein leading compressed information related to the other programs is stored in the buffer memory 19 while a certain program is being reproduced, the buffer memory 19 is logically divided by the number of programs recorded on the recording medium as described in Embodiment 2.

As illustrated in FIG. 2, when a reproducing operation of music program A is specified through the operation section 17, an instruction for reproducing music program A is inputted to the controller 16. The controller 16 extracts absolute-address information indicating the recorded area of music program A on the optical disk 1 from the TOC memory 13. Next, as shown in FIG. 11, the optical pickup 3 makes an access to 0-sector of 1-cluster in the absolute address from which music program A is recorded at time tl, and starts reading out the compressed information a0, a1, a2 and a3 from time t2.

The read-out operation of the compressed information a0 is completed at time t3, and the compressed information a0 is sent to the information-decompression processing circuit 21 from the buffer memory 19, and the resulting digital audio information A0 is sent to the D/A converter 15, and released from the output terminal 25 as analog audio information. Therefore, the reproducing operation of music program A is started from time t3.

The read-out operation of music program A is temporarily stopped at time t4. As shown in FIG. 12, at time t4, the compressed information a3, a1 and a2 is stored in the buffer memory 19 from address A. The compressed information a0 has been already decompressed, and has been reproduced as the resulting digital audio information A0; therefore, the compressed information a0 does not exist in the buffer memory 19.

Next, the optical pickup 3 makes an access to 0-sector of 4-cluster in the absolute address in order to read out the leading compressed information of music program B, and starts reading out the compressed information b0, b1 and b2 from time t5, and the resulting information is stored in the buffer memory 19, starting with address B.

During this accessing operation, the reproducing operation of the digital audio information A0 has been completed, and the compressed information a1 is sent to the information-decompression processing circuit 21, and the resulting digital audio information A1 is sent to the D/A converter 15, and released from the output terminal 25 as analog audio information. Moreover, during the read-out operation, the reproducing operation of the digital audio information A1 has been completed, and a reproducing operation of the digital audio information A2 is started.

The optical pickup 3, which has finished reading out the leading compressed information of music program B by time t6, makes an access to 0-sector of 10-cluster in the absolute address in order to read out the following compressed information a4 of music program A. Thereafter, the optical pickup 3 starts a read-out operation of the compressed information c0, c1 and c2 from time t9.

Thereafter, in the same manner as described above, by alternately reading out the compressed information of music program A and the leading compressed information of the other programs, it becomes possible to store the leading compressed information of all the programs on the optical disk 1 in the buffer memory 19 without having interruptions during the reproducing operation of music program A.

Additionally, in the buffer memory 19 of the present embodiment, pieces of compressed information corresponding to the first three blocks of pieces of digital information representative of a plurality of programs, for example, music programs A, B and C, are stored. However, the present invention is not intended to be limited to this arrangement. The first one, two, or more than four blocks of pieces of compressed information may be stored.

[EMBODIMENT 6]

Figure 13:
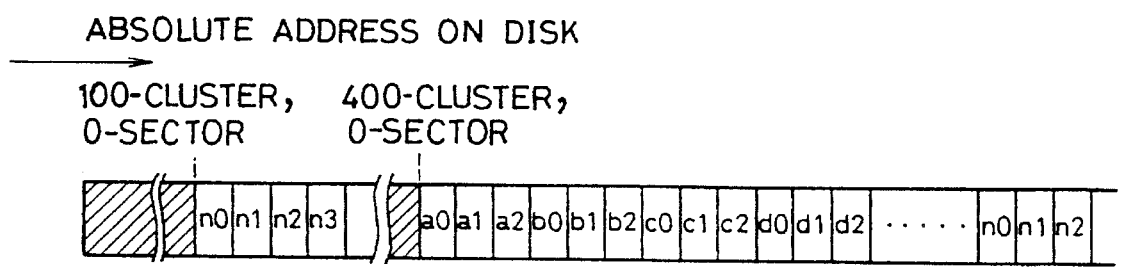
FIG. 13 is an explanatory drawing that shows an optical disk whereon the leading compressed information of each music program is recorded in the information recording-reproduction method.
Figure 14:
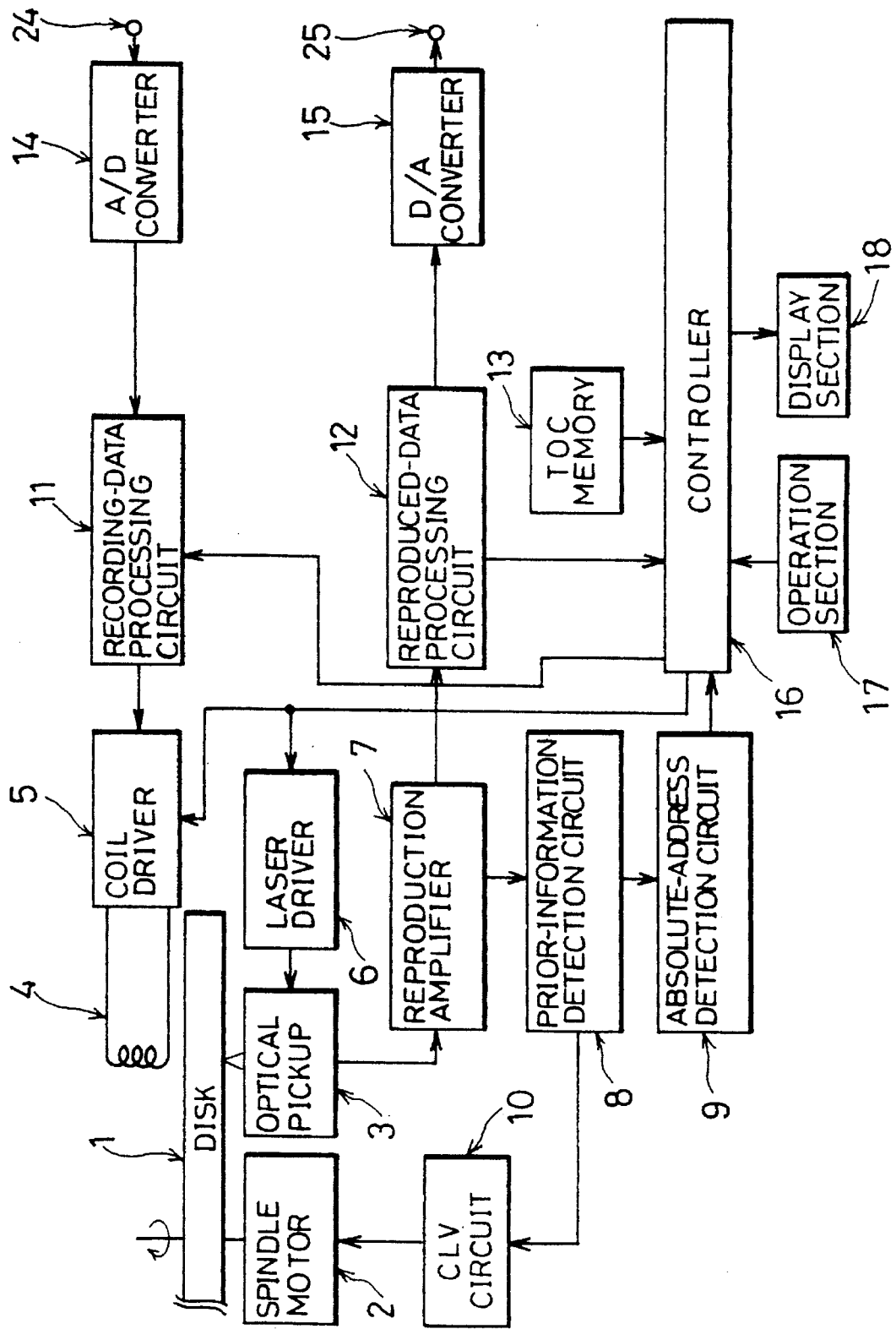
FIG. 14 is a block diagram showing a construction of an optical-disk recording-reproduction apparatus wherein a conventional information reproduction method is adopted.

Referring to FIGS. 13, the following description will discuss another embodiment of the present invention. Here, for convenience of explanation, those members that have the same functions and that are described in Embodiment 1 with reference to its drawings are indicated by the same reference numerals and the description thereof is omitted.

The information recording-reproduction method of the present embodiment is characterized in that the leading compressed information of all programs is recorded on the optical disk 1.

As illustrated in FIG. 13, the leading compressed information of all the programs on the optical disk 1, which has been obtained through the aforementioned embodiment and has been stored in the buffer memory 19, is newly stored in the optical disk 1 as a large group of information, and maintained therein. With this arrangement, when a reproducing operation is conducted on the optical disk 1 next time and thereafter, it is possible to reduce the number of accessing operations to the optical disk 1 that are needed for storing the leading compressed information in the buffer memory 19, thereby shortening time required for storing the leading compressed information.

Furthermore, this arrangement makes it possible to eliminate a slow switching operation in the case when programs are switched to start reproducing a different program.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an information recording/reproduction arrangement wherein a plurality of programs are stored on a recording medium, an information reproduction method comprising the steps of:

(a) successively reading pieces of leading compressed information, each of which corresponds to a predetermined number of blocks from the leading portion of each of a plurality of programs recorded on a recording medium, and successively storing the pieces of leading compressed information in a storage means;

(b) fetching the piece of leading compressed information of a first certain program among the programs from the storage means, and reproducing the piece of leading compressed information after decompressing it; and (c) reading first compressed information corresponding to a predetermined number of blocks following the leading compressed information of the first certain program from the recording medium and supplying the first compressed information to the storage means while the leading compressed information is being reproduced.

2. The information reproduction method as defined in claim 1, further comprising a step of:

fetching the first compressed information block by block from the storage means, and reproducing the first compressed information after decompressing it.

3. The information reproduction method as defined in claim 2, wherein, every time the first compressed information is fetched from the storage means block by block, second compressed information following the first compressed information is read from the recording medium block by block, and supplied to a vacant area in the storage means, the vacant area resulting from fetching the first compressed information.

4. The information reproduction method as defined in claim 1, wherein the leading compressed information is stored in a dedicated area in the storage means, while the first compressed information is stored in a separate dedicated area in the storage means.

5. The information reproduction method as defined in claim 4, wherein, when the first compressed information stored in the separate area is fetched therefrom, and reproduced after having been decompressed in the information-decompression means, a portion of the separate area, which stored the first compressed information before being fetched and reproduced, becomes vacant.

6. The information reproduction method as defined in claim 1, wherein the recording/reproducing arrangement includes read-out means for reading compressed information from the recording medium, said read-out means being kept in a stand-by state until the first compressed information is fetched from the storage means and a vacant area becomes available in the storage means.

7. The information reproduction method as defined in claim 1, further comprising a step of searching the storage means for a vacant area prior to step (c).

8. The information reproduction method as defined in claim 1, wherein each piece of the leading compressed information is temporarily stored in a dedicated area in the storage means.

9. The information reproduction method as defined in claim 1, wherein the storage means includes a plurality of storage areas that are dedicated to respective programs recorded on the recording medium.

10. The information reproduction method as defined in claim 9, wherein the leading compressed information is replaced by the first compressed information, block by block, in a storage area dedicated to a program that has been reproduced at step (b).

11. The information reproduction method as defined in claim 1, wherein when a second program, which is different from a first program that is being reproduced, is specified to be reproduced, fetching the leading compressed information of the second program from the storage means, and reproducing the leading compressed information after decompressing it.

12. The information reproduction method as defined in claim 1, wherein step (a), is initially carried out by an information reproduction apparatus when said apparatus is turned on.

13. In an information recording/reproduction arrangement wherein a plurality of programs are stored on a recording medium, each comprising one or more blocks of information, said arrangement including a buffer memory for storing compressed information to be recorded or reproduced wherein the buffer memory is logically divided into a number of areas dedicated to respective programs, the number being at least the same as or greater than that of the programs on the recording medium, an information reproduction method comprising the steps of:

(a) successively reading pieces of leading compressed information, each of which corresponds to a predetermined number of blocks from the leading portion of each of a plurality of programs recorded on a recording medium and successively storing the pieces of leading compressed information in the buffer memory;

(b) fetching a piece of leading compressed information of a first certain program among the programs from the buffer memory and reproducing the piece of leading compressed information after decompressing it; and (c) reading first compressed information corresponding to a predetermined number of blocks following the leading compressed information of the first certain program from the recording medium and supplying the first compressed information to the storage means while the leading compressed information is being reproduced.

14. The information reproduction method as defined in claim 13, wherein when compressed information stored in the buffer memory is fetched therefrom and reproduced after being decompressed, a portion of the buffer memory, which stored the compressed information before being fetched and reproduced, becomes a vacant area available for storage of new information, and new compressed information of the program that is being reproduced is supplied to and stored in the vacant area.

15. The information reproduction method as defined in claim 13, wherein after completing a reproducing operation of said first certain program:

fetching leading compressed information corresponding to a predetermined number of blocks from the leading portion of a second certain program among the plurality of programs from the buffer memory and reproducing that leading compressed information after decompressing; and reading subsequent compressed information corresponding to a predetermined number of blocks following the leading compressed information of the second certain program from the recording medium and supplying that compressed information to the storage means while the leading compressed information is being reproduced.

16. An information reproduction method comprising steps of:
   (a) reading out first compressed information corresponding to a predetermined number of blocks of a first certain program among a plurality of programs recorded on a recording medium and storing the first compressed information in a storage means;
   (b) fetching the first compressed information from the storage means and reproducing the first compressed information after decompressing it; and
   (c) reading out pieces of leading compressed information, each of which corresponds to a predetermined number of blocks of each of remaining programs, from the recording medium during reproduction of the first compressed information, and storing the pieces of leading compressed information in the storage means.

17. The information reproduction method as defined in claim 16, wherein the predetermined number of blocks of a first certain program that are to be read in step (a) is a number of blocks that correspond to a period of reproducing time that is not less than a time interval that is required to read the pieces of leading compressed information of all the remaining programs on the recording medium.

18. The information reproduction method as defined in claim 16, wherein the predetermined number of blocks of a first certain program that are to be read in step (a) is a number of blocks that correspond to a period of reproducing time that is not less than a time interval that is required to read the piece of leading compressed information of at least one of the remaining programs on the recording medium and to further read the same number of blocks as the number of blocks of the first compressed information.

19. The information reproduction method as defined in claim 16, wherein the first compressed information is leading compressed information corresponding to a predetermined number of blocks from the leading block of the first certain program.

20. In an information recording/reproduction arrangement wherein a plurality of programs are stored on a recording medium in a divided and compressed manner each comprising one or more blocks of information, a recording-reproduction method comprising the steps of:

reading out pieces of leading compressed information corresponding to a predetermined number of leading blocks of each of respective programs stored on the recording medium and storing the pieces of leading compressed information in a buffer memory; and upon completion of a reproducing operation, recording the respective leading compressed information of all programs at a dedicated area on the recording medium.

21. In an information recording/reproduction arrangement wherein a plurality of programs are stored on a recording medium in a divided and compressed manner each comprising one or more blocks of information, an information reproduction method for providing an outline of programs recorded on said recording medium, comprising the steps of:

reading out leading compressed information corresponding to a predetermined number of leading blocks of each of respective programs recorded on said recording medium and storing the leading compressed information in a buffer memory; and successively decompressing and reproducing only respective leading compressed information corresponding to leading blocks of all programs stored on the recording medium from the buffer memory, said successive decompressing and reproducing providing a convenient preview of all programs recorded on the recording medium.

* * * * *